H. SCHUBART.
CLAMP FOR TIGHTENING ELASTIC TUBE ENDS.
APPLICATION FILED MAY 15, 1907.
1,006,294.
Patented Oct. 17, 1911.
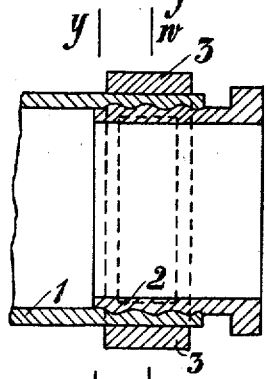
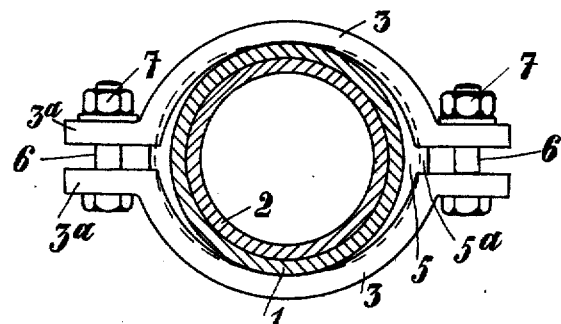
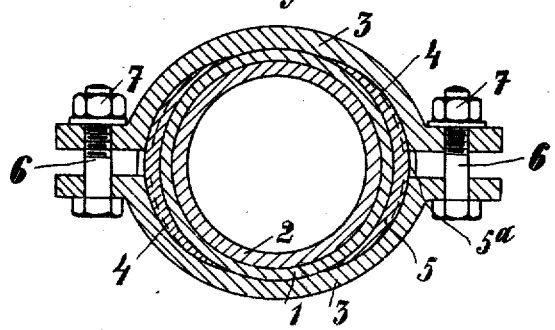
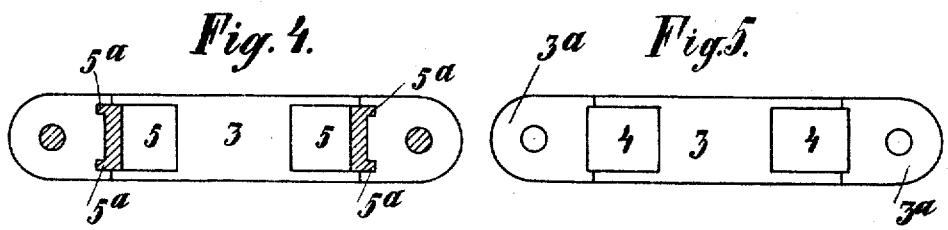
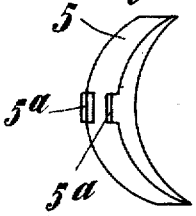
Witnesses:
Inventor:
Heinrich Schubart
by Hans Hedrich
Attorney.

UNITED STATES PATENT OFFICE.

HEINRICH SCHUBART, OF CASSEL, GERMANY.

CLAMP FOR TIGHTENING ELASTIC TUBE ENDS.

1,006,294.  Specification of Letters Patent.  Patented Oct. 17, 1911.

Application filed May 15, 1907. Serial No. 373,866.

*To all whom it may concern:*

Be it known that I, HEINRICH SCHUBART, a citizen of the Empire of Germany, residing at Cassel, in the Empire of Germany, have invented a new and useful Clamp for Tightening Elastic Tube Ends, of which the following is a specification.

For high pressures the ends of rubber hose or other elastic tubes are ordinarily tightened on the tubular connections of couplings, valves, or the like, not by means of wire wound around them, but by means of clamps each consisting of two flanged halves which are connected together by two fastening screws. Such a clamp, however, presents the defect, that it does not completely tighten the tube end, owing to the space left between the flanges when screwed together.

My invention relates to improvements in such clamps, whereby a complete tightness of the joint is obtained. The flanged halves of the clamp are provided with opposite eccentric cavities and two elastic segmental wedges are provided, which engage in the eccentric cavities and bridge over the spaces, so that the fastening screws are enabled to press the flanged halves and thereby the segmental wedges on the periphery of the tube end.

I will now proceed to describe my invention with reference to the accompanying drawing, in which—

Figure 1 is a vertical longitudinal section through an elastic tube end and the tubular connection, Fig. 2 is a vertical cross section through the same on the line y—z in Fig. 1, Fig. 3 is a vertical central cross section through the same on the line x—x in Fig. 1, Fig. 4 is a horizontal central section through the clamp proper, Fig. 5 is a view similar to Fig. 4, only that the segmental wedges are omitted, and Fig. 6 is a perspective view of one segmental wedge.

Similar characters of reference refer to similar parts throughout the several views.

1 denotes a rubber hose or other elastic tube which is to conduct some liquid or gas under high pressure. For tightening the end shown of the tube 1 on the tubular connection 2 of some coupling or the like, a clamp consisting of two flanged halves 3, 3 is employed. The halves 3, 3 are widened and are provided with opposite eccentric cavities 4, 4 (see Fig. 5), into which two segmental wedges 5, 5 (see Fig. 6) can engage. The wedges 5, 5 decrease in thickness to the ends. They bridge over the spaces between the flanges 3ª, 3ª and may be each provided with two lugs 5ª, 5ª, the length of which is equal to the distance between the flanges 3ª, 3ª. These lugs 5ª, 5ª serve for positioning the wedges 5, 5 and are preferably made thin as shown in Fig. 4.

From an examination of Figs. 2 and 3 it will be clear, that the segmental wedges 5, 5 will be pressed against the elastic tube 1 on the clamp being tightened, so that the tube end 1 will be inclosed with a nearly uniform pressure on its entire periphery, and its circular shape will be preserved in the clamp. The cavities 4, 4 in the halves 3, 3 prevent the wedges 5, 5 from laterally shifting, so that thereby the correct relative position of the halves is insured. The joint between the elastic tube 1 and the tubular connection is rendered perfectly tight.

I claim:

In a clamp for tightening elastic tube ends on tubular connections, the combination with two flanged ring-halves adapted to compress the tube end while leaving spaces between their flanges and having on their inside opposite eccentric recesses which adjoin the flanges and decrease in depth inwardly until they merge into the inside, of two segmental wedges adapted to fit into said eccentric recesses and to bridge over the spaces, and provided with lugs which are adapted to engage in the spaces and to bear against the flanges, whereby said wedges are positioned, and two fastening screws adapted to connect together said flanged ring-halves and to press them and thereby said segmental wedges on the periphery of the elastic tube end.

In testimony whereof I have hereunto set my hand in the presence of two subscribing witnesses.

HEINRICH SCHUBART.

Witnesses:
 HEINRICH ANGST,
 GEORG DUDENHÖFFER.